United States Patent [19]

Bennett et al.

[11] Patent Number: 4,484,354
[45] Date of Patent: Nov. 20, 1984

[54] CONTINUOUS TONE DECODER/ENCODER

[75] Inventors: Robert M. Bennett, Minneapolis, Minn.; Ronald H. Chapman, Wheaton, Ill.

[73] Assignee: Motorola, Inc., Schaumburg, Ill.

[21] Appl. No.: 197,408

[22] Filed: Oct. 16, 1980

[51] Int. Cl.³ .......................... H04B 1/48; H04Q 1/45
[52] U.S. Cl. ...................................... 455/35; 455/84; 340/825.44
[58] Field of Search ...................... 455/35, 36, 37, 38, 455/75, 76, 84, 85, 86, 87; 340/171 R, 311, 312, 147 PC, 825.04, 825.03, 825.44, 825.52, 825.56

[56] References Cited

U.S. PATENT DOCUMENTS 3,835,394 9/1974 Stolt ...................................... 358/38
4,017,748 4/1977 Davis ..................................... 455/38
4,021,653 5/1977 Sharp ..................................... 455/35

Primary Examiner—Tommy P. Chin
Attorney, Agent, or Firm—F. John Motsinger; Edward M. Roney; James W. Gillman

[57] ABSTRACT

An improved encoder/decoder circuit which utilizes a phase locked loop frequency synthesizer configuration to permit both encoder and decoder operation. In addition, a sampling filter detector is employed to permit monolithic integration of the circuit and minimize sensitivity to vibration. The sampling filter detector has digitally controlled bandwidth which permits rapid response to reverse burst turn-off. In addition, the circuit includes a pulse adder to implement an energy limited reverse burst turn-off mode.

7 Claims, 7 Drawing Figures

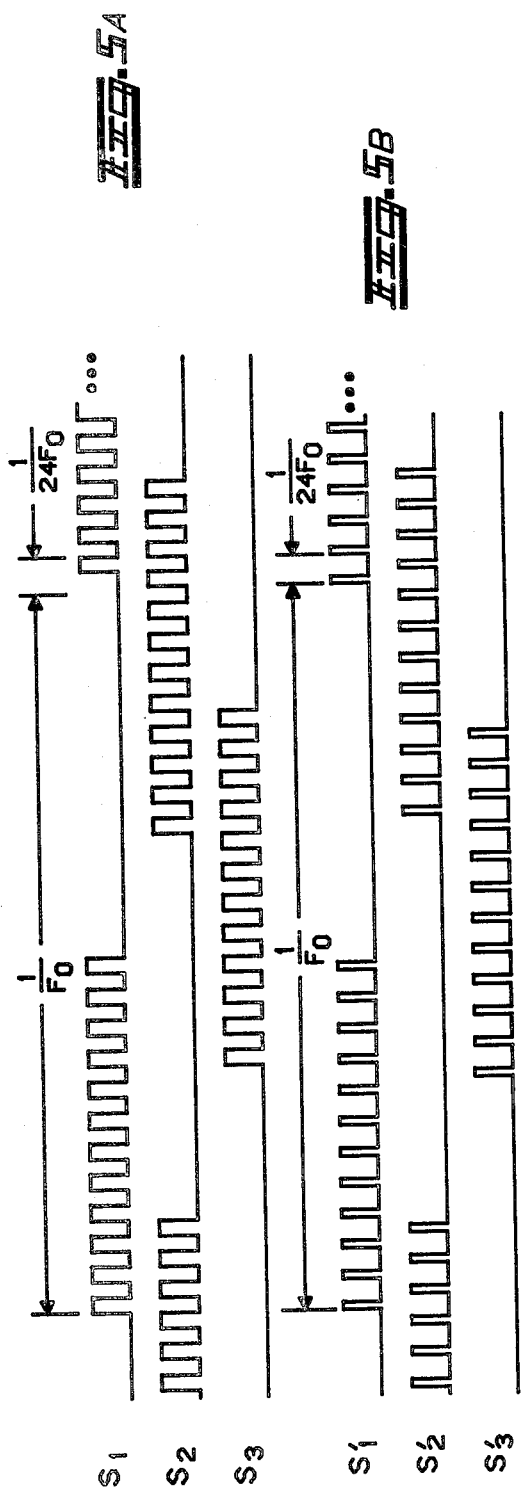
FIG. 5A
FIG. 5B
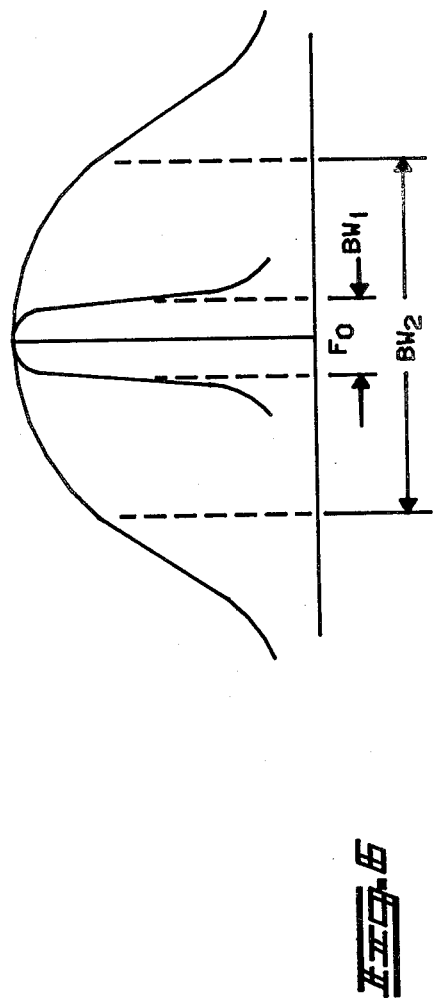
FIG. 6

CONTINUOUS TONE DECODER/ENCODER

BACKGROUND OF THE INVENTION

A. Field of the Invention

This invention relates generally to the electronic signalling art and, in particular, to an improved encoder/decoder system suitable for tone coded squelch systems.

B. Description of the Prior Art

As a result of the extensive use of radio communications channels presently available, it has become common practice especially in heavily populated metropolitan areas to have several communications systems operating on a common radio channel. Operators whose radios are not equipped with some form of tone squelch must listen to all conversation on the channel from transmitters that are within range. This is both annoying and fatiguing for the operators. The use of tone squelch to alleviate the annoyance is a common solution to the problem. A standard for sub-audible continuous tone control squelch systems (CTCSS) is covered in Electronic Industries Association (EIA) Standard RS 220-A, published in March, 1979.

Basically, such systems operate by equipping each radio transmitter in the particular radio system with a tone encoder operating on one of the 33 standard EIA channels between 67.0 and 250.3 Hz. When the transmitter is keyed, the operator's voice modulates the transmitter in the 300–3000 Hz range and simultaneously with the voice, the sub-audible tone modulates the transmitter as well.

Receivers within the radio system are equipped with a frequency selective device (tone decoder) tuned to the same tone frequency as the tone encoder within the transmitters of the system. This tone decoder normally holds the receiver in the squelched mode. If the received signal is not modulated with a tone or is modulated with a tone that is not on the decoder frequency, then the receiver will remain squelched and the operator will not hear the interference. If a transmission is received having a tone corresponding to the frequency of the tone decoder, the receiver will be unsquelched and the operator will receive the message.

Many of the tone squelch systems now being manufactured employ vibrating mechanical resonant reeds. Resonant reed systems suffer from a number of problems. In order to reprogram such a system, the resonant reed must be replaced by a reed of another frequency. Long lead times are involved as service organizations rarely stock the 33 types of encoding and decoding reeds required for this type of change. In addition, vibrating mechanical reeds suffer from short life and false operation when subject to vibration encountered in vehicular two-way radio service.

Solutions for these and other problems are provided by the instant invention which is an integratable, solid state, programmable encoder/decoder tone coded squelch system. The frequency of the tone to be detected and the tone encoder is programmable and can be specified with sufficient accuracy to meet EIA standards for sub-audible continuous tone controlled squelch systems.

SUMMARY OF THE INVENTION

Accordingly, it is an object of this invention to provide an improved, combined encoder/decoder circuit suitable for tone coded squelch application.

It is another object of the invention to provide an improved combined encoder/decoder circuit with easily programmable tone frequencies.

It is yet another object of the invention to provide an improved combined encoder/decoder circuit with highly stable tone frequency generation.

It is yet another object of the invention to provide an improved combined encoder/decoder circuit capable of multiple reverse burst mode operation.

Briefly, according to one embodiment of the invention, an improved combined encoder/decoder circuit for use in a continuous tone coded squelch two-way radio system is provided. The circuit is operable in encoder mode to provide a tone output signal of a predetermined frequency and in a decoder mode to provide a detect signal in response to a signal applied to an input having a predetermined frequency. The circuit comprises a reference oscillator for generating a stable reference signal of predetermined frequency at an output and a frequency synthesizer coupled to the reference oscillator output for generating a signal of predetermined frequency. A sine generating means is coupled to the frequency synthesizer, and has first and second control inputs, for generating and phase shifting a sine wave tone from the signal generated by the frequency synthesizer in response to signals applied to the first and second control inputs. A decoder means having a first input and a second input, for providing a detect signal at an output in response to receipt of signals of predetermined frequency at the first input and has its second input coupled to the output of the frequency synthesizer.

According to another feature of the invention, there is provided an improved combined encoder/decoder circuit which comprises a frequency generating means having a first and second output and a control input, for generating a signal of predetermined frequency at the first output, and for generating a signal of predetermined frequency at the second output in response to a signal applied to the control input. A decoder means having an input and an output is provided for generating a detect signal at the output in response to receipt of signals of a predetermined tone frequency at the input. A pulse adder means is also provided having a control terminal, an output coupled to the decoder means, and an input coupled to the output of the frequency generating means for reducing the response of the decoder means to the predetermined tone frequency in response to a signal applied to the control terminal.

BRIEF DESCRIPTION OF THE DRAWINGS

The features of the present invention which are believed to be novel are set forth with particularity in the appended claims. The invention, together with further objects and advantages thereof, may best be understood by reference to the following description when taken in conjunction with the accompanying drawings.

FIGS. 5A and 5B are a series of timing waveforms developed at the output of the phase control circuit shown in FIG. 3.

FIG. 6 is a set of response curves illustrating the typical bandwidth characteristics attainable by the tone decoder shown in FIG. 2.

DESCRIPTION OF THE PREFERRED EMBODIMENT

Figure 1:
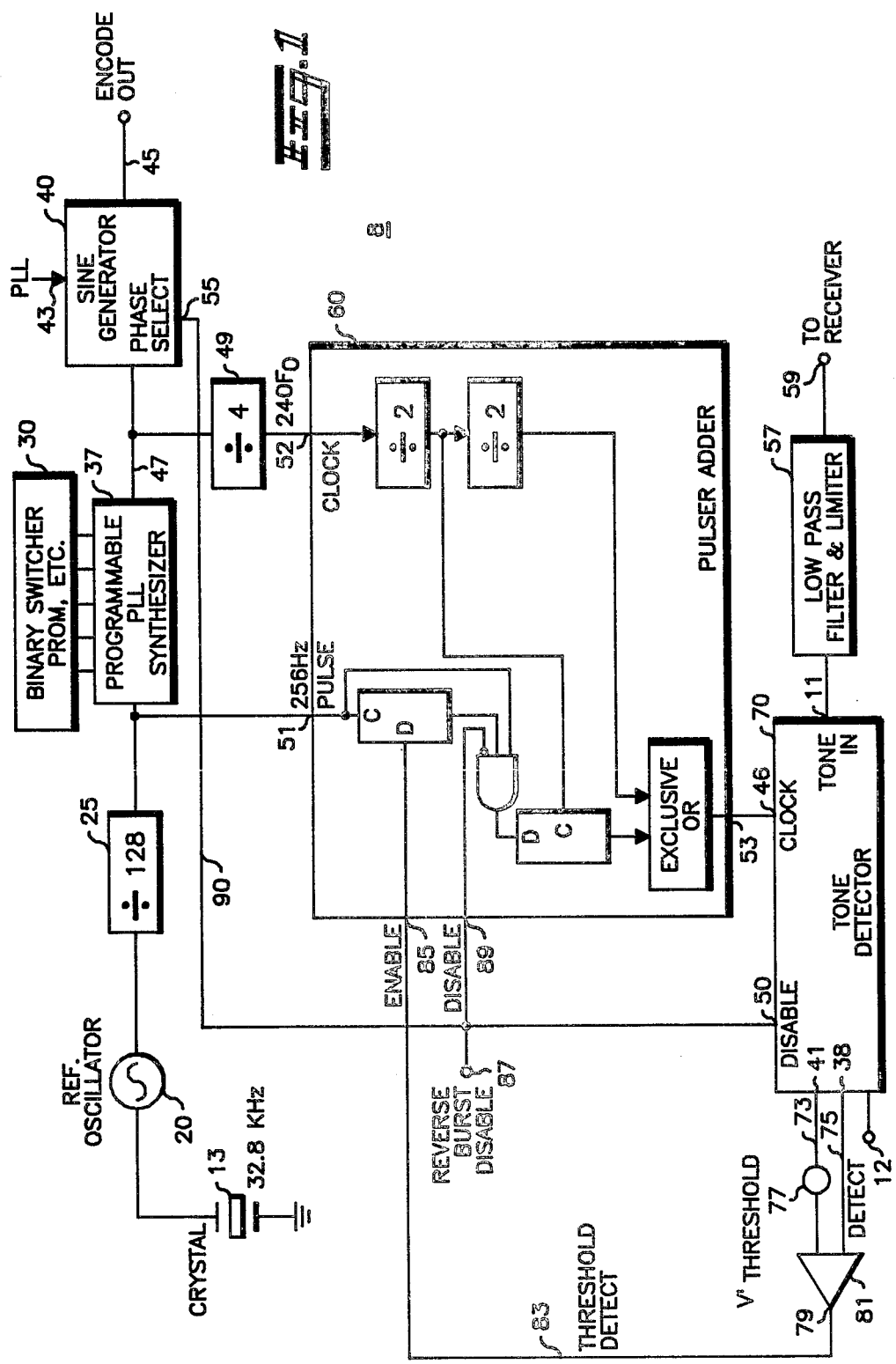
FIG. 1 is a block diagram of a combined encoder/decoder circuit according to the invention.

FIG. 1 illustrates a combined encoder/decoder circuit 8 which can be used both for producing output signals and detecting input signals having a precise, predetermined frequency. A reference oscillator 20 combined as shown with a crystal 13 generates a precise reference signal which is coupled directly to a divide-by-128 divider 25. The divided signal from the divider 25 is coupled as shown to a programmable phase-locked loop synthesizer 37. The programmable phase-locked loop synthesizer is of a conventional type utilizing a programmable loop divider (not shown). The programmable phase-locked loop synthesizer is programmed from a data device 30 which can be any of a variety of apparatus including such devices as binary switches, toggle switches, programmable read only memories (PROM's), etc. In the preferred embodiment a PROM is used which stores two five-bit data words which are multiplexed into the programmable phase-locked loop synthesizer 37. Once programmed, the programmable phase-locked loop synthesizer 37 functions in the conventional manner to produce a stable output frequency of the programmed value at its output 47. This output signal is coupled directly to a sine generator 40 as shown, which utilizes the stable frequency output of the programmable phase-locked loop synthesizer 37 and generates a sine wave tone at its output 45. This output signal is the encoding tone signal which in a tone controlled squelch system would be coupled to the transmitter.

The sine generator functions to continually generate the encoding tone output on its output 45 and to phase shift the tone by either 180° or 240° in response to signals applied to an enable input 43, and a phase shift select input 55. The phase shift select input 55 is coupled, as shown, to a reverse burst disable input 87 via a conductor 90. A low signal coupled to the phase shift select input 55 will cause the sine generator 40 to phase shift the encode tone by 240° when the enable input 43 is activated. A high signal coupled to the phase shift select input 55 will phase shift the encode tone by 180° when the enable input 43 is activated. In a typical application, the sine generator enable input 43 would be activated by an operator releasing a push-to-talk button. Deactivating the enable input 43 (such as by activating the push-to-talk button) will cause the sine generator to shift the encode tone back to the nominal phase condition. Thus a standard end of transmission reverse burst of phase shift of 180° is provided when the phase select input 55 is high, and an energy limited reverse burst phase shift of 240° is provided when the phase select input 55 is low. The sine generator 40, which may be of any known type, can be a wave shaping circuit and a set of properly gated phase shift networks.

The output signal from the divide-by-128 divider 25 is also coupled to the clock input 51 of a pulse adder 60, as shown. Various pulse adder circuits are known in the art, however, a specific example of a pulse adder is illustrated in FIG. 1 as pulse adder 60. The functioning of the gates, dividers and flip-flops shown, is believed to be sufficiently well understood in this art without requiring illustrating the truth tables for these devices or other detailed explanations. Functioning in the conventional manner a pulse adder, when enabled, adds a pulse to an incoming clock waveform in order to increase its frequency.

The output 47 of the programmable phase-locked loop synthesizer 37 is coupled to a divide by four divider 49 as shown, which divides the output signal from the programmable phase-locked loop synthesizer 37 and applies the divided signal to the clock input 52 of the pulse adder 60. The output signal from the pulse adder, which will be either the clock input $240F_0$ (where $F_0$ is the frequency of the desired detect tone) or a frequency slightly greater, due to the addition of pulses, is applied to the output 53 of the pulse adder 60. This output signal at the output 53 of the pulse adder 60 is coupled directly to the clock input 46 of a tone detector 70. An input signal to be decoded is provided at an input terminal 59 which in a conventional tone coded squelch system is coupled from the receiver discriminator. This signal is passed through a low-pass filter and limiter 57 and coupled directly to the tone decoder tone input 11. The tone detector 70 produces a detect signal on an output 12 when the predetermined desired tone of frequency $F_0$ is detected at the input 11.

In addition, a conductor 75 couples an internal conductor 38 (see FIG. 2) to a differential amplifier 81 and a conductor 73 couples an internal conductor 41 (see FIG. 2) of the tone detector 70 to a threshold circuit 77. The threshold circuit 77 is coupled directly to a second input of the differential amplifier 81. This circuit forms a threshold detection comparator which detects when the tone decoder has reached an energy threshold requiring limiting. When the limiting threshold is reached, the output 79 of the differential amplifier 81 will go high and will be coupled through the conductor 83 to the enable input 85 of the pulse adder 60. This will result in enabling the pulse adder so that if a low signal is simultaneously applied to the disable input 89, the pulse adder will add pulses to the clock signal which is input at the clock input 52 of the pulse adder 60. The pulses will be added at a frequency of 256 Hz from the pulse input 51. The net result of this pulse addition will be to change by approximately 1 Hz the predetermined frequency of the tone to be detected by the tone detector 70. This change in the detection frequency when the tone at the input 11 remains the same results in a reduction in sensitivity of the tone detector and thereby limits the detection energy level within the tone detector 70.

It can be seen that a combined encoder/decoder system is provided which can produce a stable tone output frequency and in addition can function in two detector reverse burst modes. The first detector reverse burst mode is a reverse burst mode in which the tone detector is enabled to detect the reverse burst end of a tone by change of bandwidth. This mode will be activated when the reverse burst disable input 50 of the tone detector 70 is at a high or logic 1 level. The second mode is an energy limited reverse burst mode in which the tone detector detects a predetermined tone while detection of the reverse burst termination of that tone is made possible by the energy limiting action of the pulse adder. This mode is activated by applying a low or logic 0 level at the input 89 of the pulse adder. Since the input 89 of the pulse adder 60 and the input 50 of the tone detector 70 are coupled to the terminal 87, a high on the terminal 87 will result in a dual bandwidth reverse burst mode and a low on the terminal 87 will result in an energy limited reverse burst mode. The mechanism of the reverse burst detection will be more fully described below.

Figure 2:
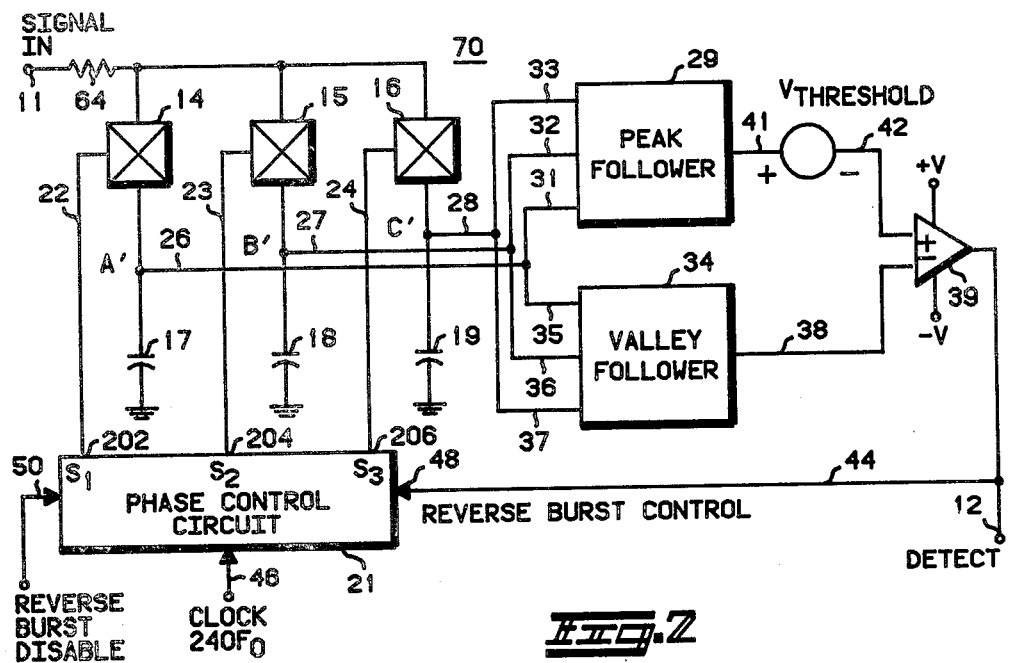
FIG. 2 is a block diagram illustrating one embodiment of the tone detector circuit shown in FIG. 1.

Referring now to FIG. 2, there is shown a detailed block diagram of a preferred embodiment of the tone detector 70 shown in FIG. 1. This detector is a sampling filter detector with controlled bandwidth capability. This sampling filter detector circuit 70 develops a detect signal at an output terminal 12. The input signal applied to the input terminal 11 is sampled by solid state switches 14, 15 and 16 and the samples are stored in capacitor 17, 18 and 19, respectively. It should be noted that the function of the solid state switches 14, 15 and 16 is equivalent to that of multipliers. The solid state switches 14, 15 and 16 may be field effect transistors, bipolar transistors, or other devices known to those skilled in the art. The terminals of the capacitors opposite the switches are connected to a reference potential which, as shown, can be ground. The solid state switches 14, 15 and 16 are turned on and off at appropriate time intervals by pulses developed in the phase control circuit 21 through conductors 22, 23 and 24, respectively.

The voltages appearing on the capacitor 17, 18 and 19 are coupled through the conductors 26, 27 and 28 and through the conductors 31, 32 and 33 to a peak voltage follower 29. The voltage on the capacitors 17, 18 and 19 are also coupled through the conductors 26, 27 and 28 and through the conductors 35, 36 and 37 to a voltage valley follower 34. The output of the voltage valley follower 34 is coupled through a conductor 38 to the negative input of a differential amplifier 39 and the output of the peak voltage follower 29 is coupled through conductors 41 and 42 to the non-inverting input terminal of the differential amplifier 39. A voltage $V_{threshold}$ is connected between the conductors 41 and 42 in order that the threshold at which the differential amplifier 39 will change from no signal at the output terminal 12 to a high signal at the output terminal 12 may be predetermined. Essentially, the signal at the output terminal 12 is a logical zero or a logical one depending on the value of the threshold and the voltage values on the capacitors 17, 18 and 19, as will be more fully explained below.

The digital phase control circuit 21 is driven by a clock at the terminal 46 with a frequency $240F_0$, where $F_0$ is the frequency of the desired tone to be detected. A conductor 44 couples the output terminal 12 to the reverse burst control terminal 48 of the phase controlled circuit 21. In addition, a reverse burst disable input 50 is provided.

Figure 3:
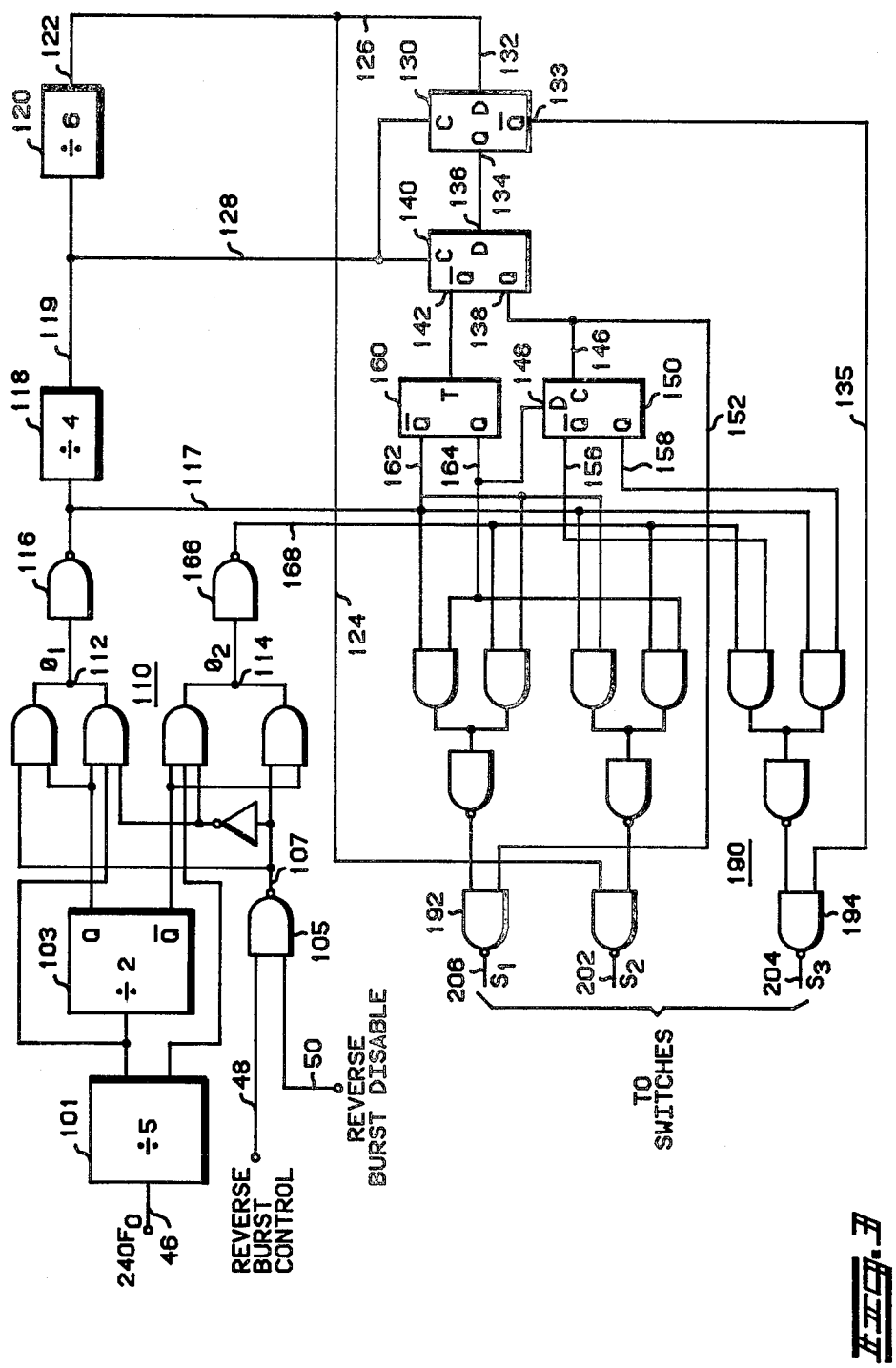
FIG. 3 is a detailed diagram of the phase control circuit of the tone decoder shown in FIG. 2.

Now, referring to FIG. 3, there is shown a detailed diagram of the phase control circuit 21 shown in FIG. 2. A clock signal equal approximately to $240F_0$ is applied to the clock terminal 46 and directly to a divide-by-five divider 101. The output of the divider 101 is applied to a divided-by-two divider 103 and the output of both dividers 101 and 103 is coupled to a gating network indicated generally by the reference numeral 110. In addition, an AND gate 105 is provided having reverse burst control input 48 and a reverse burst disable 50. The output 107 of the AND gate 105 is also coupled to the gating network 110. As a result of the division of the clock signal applied to the clock terminal 46 by the dividers 101 and 103, two signals are generated at the outputs 112 and 114 of the gating network 110 with a frequency 1/10th of the clock frequency (i.e. approximately $24F_0$). These two signals $\phi_1$ and $\phi_2$ are 180° out of phase due to the action of the gating network 110 which functions in a manner well known in the digital logic art. The functioning of the gates is believed to be sufficiently well understood in this art without the requirement of illustrating the truth tables for these devices or other detailed explanation.

Figure 4:
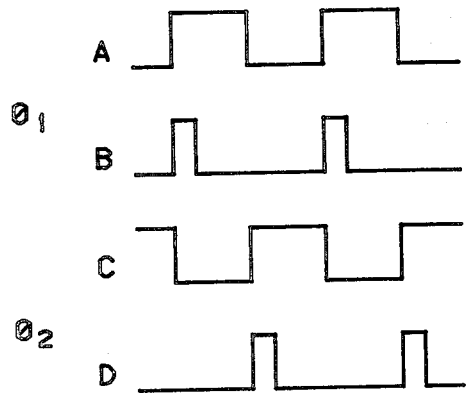
FIG. 4 is a series of typical waveforms generating by the circuitry of the phase control circuit illustrated in FIG. 3.

When a low logic level is applied to the reverse burst disable input 50, the output 107 of the AND gate 105 will always be low (i.e. gate 105 will be disabled). This will result in the waveforms $\phi_1$ and $\phi_2$ having the form of waveforms B and D as shown in FIG. 4, respectively. When a high logic level is applied to the reverse burst disable 50, the output 107 of the AND gate 105 will be low if the reverse burst control terminal 48 is low and high when the reverse burst control terminal 48 is high (i.e. gate 105 will be enabled). Thus, with the reverse burst control terminal low, the waveforms at the outputs 112 and 114 of the gating network 110 will be the waveforms B and D of FIG. 4 as described above. However, with the reverse burst control terminal high, the waveforms $\phi_1$ and $\phi_2$ at the outputs 112 and 114 will be such as those shown in FIG. 4 as waveforms A and C. Waveforms A and C of FIG. 4 have a duty cycle of 50%, while the waveforms B and D of FIG. 4 have a duty cycle of 10%. Thus, when the AND gate 105 is enabled by a high on the reverse burst disable input 50, two waveforms, each with a frequency $24F_0$ and each 180° out of phase will be generated at the outputs 112 and 114 of the gating network 110, and each will have a duty cycle of 10% when the reverse burst control input 48 is low or a duty cycle of 50% when the reverse burst control input 48 is high.

The waveform $\phi_1$ at the gating network output 112 is coupled through an inverter 116 to a divide-by-four divider 118 as shown. The output 119 of the divider 118 is coupled to a divide-by-six divider 120. The combination of the dividers 118 and 120 form a divide-by-24 divider and therefore the output signal at the output 122 of the divider 120 is a waveform with a frequency of approximately $F_0$. This signal is coupled to the D input 132 of a flip-flop 130. The Q output 134 of the flip-flop 130 is coupled as shown to the D input of another flip-flop 140 and the $\overline{Q}$ output 133 is coupled via a conductor 135 to a NAND gate 194 of a gating network indicated generally by the reference numeral 190. In addition, the output 119 of the divider 118 is coupled to the clock inputs of the flip-flops 130 and 140, as shown. The Q output 138 of the flip-flop 140 is coupled to the clock input 146 of flip-flop 140 and coupled via a conductor 152 to a NAND gate 192 of the gating network 190. The $\overline{Q}$ output 142 of the flip-flop 140 is coupled to the T input of a flip-flop 160 and the Q output 154 of the flip-flop 160 is coupled to the D input 148 of the flip-flop 150, as shown. These flip-flops 130, 140, 150 and 160 provide timing and phase adjust waveforms to the gating network 190.

The output waveforms from the flip-flops 150 and 160 are coupled to the gating network through conductors 156, 158, 162 and 164, as shown. In addition, as described above, a signal of frequency approximately $F_0$ (i.e. the frequency of the desired tone) is generated at the output 122 of the divider 120. This signal is coupled to the gating network 190 via a conductor 124. The waveform $\phi_1$, which has a frequency of approximately $24F_0$, is coupled to the gating network 190 through the inverter 116 and via a conductor 117, and the waveform $\phi_2$, also having a frequency of $24F_0$, is coupled to the gating network 190 through an inverter 166 and via a conductor 168, as shown. The gating network, provided with the timing and phase adjust signals fundamental frequency $F_0$ and the signals, $\phi_1$ and $\phi_2$ of the frequency $24F_0$, generate the signals S1, S2 and S3 at the outputs 202, 204 and 206, respectively, such as those shown in FIGS. 5A and 5B. The function of the gate network 190 is believed to be sufficiently well understood in this art without the requirement of illustrating the truth tables for these devices or other more detailed explanation.

It should be noted that each waveform S1, S2 and S3 is composed of a switching period made up of a rectangular switching waveform with a frequency of approximately $24F_0$. In addition, each switching is approximately one-half ot the period of the fundamental frequency of the desired tone $F_0$. Also, the waveforms S1, S2 and S3 of both FIGS. 5A and 5B are so phased that they overlap each other by 60° of the fundamental frequency and are interleaved so that only one of the waveforms S1, S2 or S3 is at a high level at any time.

The waveforms shown in FIG. 5A are those which are generated at the outputs 202, 204 and 206 when the waveforms $\phi_1$ and $\phi_2$ have a 50% duty cycle, which as described above, occurs when the reverse burst control input 48 is high and the reverse burst disable input 50 is high. Waveforms S1, S2 and S3 of FIG. 5B are those generated at the outputs 202, 204 and 206, respectively, when the waveforms $\phi_1$ and $\phi_2$ have a 10% duty cycle. As described above, this occurs when the reverse burst control input 48 is low or when the reverse burst disable input 50 is low. These waveforms S1, S2 and S3 at the outputs 202, 204 and 206 are coupled as shown in FIG. 2 over the conductors 22, 23 and 24 to control the closing and opening of the switches 14, 15 and 16, respectively. In each case, the switch will be turned on (i.e. closed) when the pulses of the waveforms S1, S2 and S3 are high and will be turned off (i.e. open) when the pulse drops to zero. The high level of the pulse can be considered as logical 1's and the low level of the pulse as logical 0's in the digital logical circuitry of the phase control circuit 21. Thus, each of the switches 14, 15 and 16 are successively opened and closed over a switching period equal to one-half the period of the desired tone frequency $F_0$ and remain open for the other half of the period of $F_0$.

As a result, it can be seen that the function of the phase control circuit 21 is to successively open and close the solid state switches 14, 15 and 16 (12 times in this embodiment) for 180° intervals of the frequency $F_0$, which is the tone frequency to be detected. In addition, by the appropriate choice of logic input levels to the inputs 50 and 48 shown in FIG. 1, a duty cycle of 50% or 10% can be programmed for the switching function. Thus, the total time that each switch is closed during its switching period can be digitally programmed to either 50% or 10% of the switching period. Finally, the waveforms S1, S2 and S3 will assure that no more than one switch 14, 15 or 16 will be closed at any one time since no more than one waveform is at a logical 1 at any time.

Inasmuch as positive pulses turn on the switches, it can be observed by reference to FIG. 2 and FIG. 5A that switch 14 is open and closed 12 times during the switching period of 180° of $F_0$, and opened for the remainder of the cycle, followed by switch 16 being opened and closed by the waveform S3 for 180°, and overlapping the switching period of switch 14 by 60°. Finally, switch 15 is opened and closed by waveform S2 for 180° of $F_0$ and overlaps the switching period of switch 16 by 60° and the next switching period cycle of switch 14 by 60°. It is essential as will be described later that no more than one switch be closed at any one time but the order in which the switches are activated and the exact amount of overlap is not critical. However, it should be noted that the positive pulses of S1, S2 and S3 are interleaved so that during overlapping intervals only one waveform is at a logical 1 level at any time.

Assuming an input signal is applied to the input 12 of FIG. 2, then during the initial 180° switching period the capacitor 16 is charged to some average value due to the repeated closing of switch 15. Similarly, during the succeeding 180° switching intervals the capacitor 19 will assume a charge of some average value and during a third switching period of 180° the capacitor 18 is charged to some average value. It is understood, of course, that the process repeats at the drive frequency $F_0$.

The peak voltage follower 29 (see FIG. 2) which may be of any well known type, but could be a series of appropriately poled diodes, follows peak voltage as received over the conductors 31, 32 and 33, providing a plus output voltage at the conductor 41. The voltage valley follower 43, which also may be of any well known type, for example, a series of properly poled diodes, follows the voltage valleys as received over the conductors 35, 36 and 37, providing a negative output voltage at conductor 38. The difference between valley voltages and peak voltages as modified by the threshold voltage $V_{threshold}$ is applied to the inverting and non-inverting terminals of the high gain differential amplifier 39, as already explained. The threshold can be selected to be any desired value such that when the difference between the peak voltages and the valley voltages exceeds the threshold, the amplifier 39 will supply a detect signal. When the difference between the peak voltages and the valley voltages is less than the threshold, there will be no detect output signal at the threshold 12. In other words, when the frequency of the input signal is within the bandwidth, and of sufficient amplitude there will be an output signal which can be a logical 1. Whenever the input signal is not within the bandwidth, the differences between the peak voltages and valley voltages will be less than the necessary differential and the output of the amplifier 39 will be low or a logical 0. The response of the filter is thus very sharp.

It should be understood that if more than one switch was closed at any time, the affected capacitors would be charged to the same value and since the sampling filter detector relies on the difference between the average voltage values on the capacitors, it is clearly essential that only one switch can be allowed to close at any given time. This is accomplished by the interleaving of the switching pulses.

The bandwidth is determined by two factors. The first factor is the combined magnitude of the resistor 64 connected to the input circuit and the capacitive values of the sampling capacitors 17, 18 and 19. The resistor and capacitor form an attenuating circuit which rapidly attenuates the output when the input frequency varies from the desired or fundamental frequency. (Typical value resistor is 15 K-ohms and a typical value capacitance is 0.1 microfarads.) The second determining factor establishing the bandwidth is the duty cycle of the pulses during the switching period and therefore the total time that each switch is closed during each switching period. This is due to the fact that the Q of the circuit is directly proportional to the amount of time that each capacitor is permitted to charge during each switching period. As a result, the shorter the duty cycle of the switching waveform during each switching period, the higher the Q of the circuit and therefore the narrower the bandwidth. In fact, the bandwidth is inversely proportional to the duty cycle of the switching waveform during the switching period. This is illustrated in FIG. 6 for the circuits shown in FIG. 2. For conditions in which the reverse burst disable 50 or the reverse burst control 48 are low as described above, the duty cycle of the switching waveform will be 10% and therefore the duty cycle of the sampling filter detector will be the narrow bandwidth $BW_1$, as shown in FIG. 6. When both the reverse burst disable 50 and the reverse burst control 48 are high, the duty cycle becomes 50% and the bandwidth becomes much wider, to that shown as $BW_2$ in FIG. 6. Thus, the bandwidth can be easily controlled by digital means without altering passive components.

As a result (see FIG. 2), if a detect occurs, resulting in a high on the detect output 12, then that high condition is coupled to the reverse burst control input 48 via the conductor 44. If a high is applied to the reverse burst disable thus enabling the reverse burst bandwidth control capability of the circuit, then the detection will cause the circuit to switch to a wide bandwidth condition. This permits the circuit of FIG. 1 to respond rapidly to reverse burst input tone at the input 12. This capability permits the circuit of FIG. 1 to be used in a continuous tone control squelch system which utilizes a reverse burst for turn-off at the end of a transmission.

Standard continuous tone controlled squelch systems required that once a tone has been detected, the state of no detect must be reached more quickly than if the tone had simply been removed, in order to avoid annoying squelch tails. This is accomplished by using a reverse burst by suddenly shifting the tone signal by 180°. By widening the bandwidth, the circuit of FIG. 1 can respond more rapidly to this 180° phase shift, thus permitting the capacitors 17, 18 and 19 to discharge more rapidly so that the output 12 will revert to a low or no detect condition more rapidly.

The harmonic response of the sampling filter detector is determined by the switching waveforms. The sampling filter does not produce an output for any harmonic which averages to zero over the switching period. Therefore, since the switching period in this embodiment is 180° of $F_0$, no even harmonic (i.e. second, fourth, sixth, etc.) will result in an output. (It should be noted that the switching period need only be approximately 180° to provide adequate performance.) In addition, the sampling filter does not respond to DC or multiples of the third harmonic because of the common mode cancellation that exists as a result of the use of three capacitors. Thus, it can be seen that this sampling filter detector does not respond to second, third or fourth harmonics of the fundamental desired tone frequency $F_0$. This makes the circuit highly suitable for continuous tone coded squelch systems since the fifth harmonic is high enough in frequency and low enough in amplitude to be outside the band of response for such tone coded squelch systems.

Referring again to FIG. 1 and the above description, it can be seen that by placing a high on the reverse burst disable input 87, the high is coupled to the disable input 50 of the tone detector resulting in a dual bandwidth reverse burst mode for the tone detector. At the same time, the high on the input 87 would be coupled to the disable input 89 of the pulse adder disabling the pulse adder and thereby coupling the output of the divide-by-four divider 49, of frequency $240F_0$, to the clock input 46 of the tone detector 70. However, if a low or 0 level is applied to the reverse disable input 87, the 0 level is coupled to the disable input 50 of the tone detector, thus maintaining the tone detector in the narrow bandwidth condition. The low applied to the reverse burst disable input 87 is also coupled to the disable input 89 of the pulse adder thereby enabling the pulse adder and thereby putting the combined encoder/decoder into an energy limited reverse burst mode. In some tone controlled squelch systems, such as those using resonant reeds, the reed energy is limited to permit faster turn-off, but such a system requires a reverse burst phase shift of 240° instead of 180°. Thus, when the combined encoder/decoder of FIG. 1 is in the energy limited mode, it is designed to operate in such an energy limited reverse burst system. In this mode, the output of the peak follower 29 and the valley follower 34 (see FIG. 2) are coupled from the output conductor 41 and 38, respectively, to the threshold detector composed of differential amplifier 79 and the $V'_{threshold}$ circuit 77. When the difference between the two voltage values from the peak followers 29 and the valley follower 34 exceeds $V'_{threshold}$, the output 81 of the differential amplifier 79 goes high, resulting in a high voltage being applied via the conductor 83 to the enable input 84 of the pulse adder. This enables the pulse adder causing the pulse adder to add pulses to the clock frequency of $240F_0$ which is coupled at the input 52 of the pulse adder. The pulses are added at a frequency of approximately 256 Hz resulting in a signal at the output 53 which has a higher frequency than the clock input at the input 52. This higher frequency signal at the output 53 is coupled directly to the clock input 46 of the tone detector 70. As a result of the added pulses, the detect frequency of the tone detector 70 is increased by approximately 1 Hz. This results in the tone detector being less sensitive to the incoming tone $F_0$ which is now 1 Hz from that which the tone detector is tuned to. The ultimate result is that the charge on the capacitors 17, 18 and 19 is limited to a value determined by the $V'_{threshold}$ so that when a reverse burst of 240° is received at the tone input 11, the limited charge on the capacitors is quickly discharged and the detect output 12 drops to a low.

It can be seen from the above description that a combined encoder/decoder system is provided which can provide highly stable output encode tones and is capable of operating in either a dual bandwidth reverse burst mode or an energy limited reverse burst mode. The system, in addition, can be easily programmed to different frequencies by merely changing a PROM. Finally, all of the components described, except for the resistor 64, the capacitors 17, 18 and 19 and the crystal 13, can be easily realized in integrated form.

While a preferred embodiment of the invention has been described and shown, it should be understood that other variations and modifications may be implemented. It is therefore contemplated to cover by the present application any and all modifications and variations that fall within the true spirit and scope of the basic underlying principles disclosed and claimed herein.

What is claimed is:

1. An improved combined encoder/decoder circuit for use in a continuous tone encoded squelch two-way radio system, and operable in an encoder mode to provide encoded tone output signals of a pre-determined frequency and in a decoder mode to provide a detect signal in response to an encoded signal applied to an input having said pre-determined frequency, comprising:
 (a) a reference oscillator, for generating a stable reference frequency at an output;
 (b) a frequency synthesizer coupled to the reference oscillator output for generating an encoded signal of pre-determined frequency;
 (c) sine generating mens, coupled to the frequency synthesizer and, having first and second control inputs, for generating a sine wave encoded tone from the signal generated by the frequency synthesizer and phase shifting said encoded tone in response to signals applied to the first and second control input;
 (d) decoder means having a first input coupled to the frequency synthesizer, a second input for receiving encoded signals and an output for providing a detect signal in response to receipt of encoded signals of said pre-determined frequency at the second input.

2. The improved combined encoder/decoder of claim 1, wherein said frequency synthesizer is programmable.

3. The improved combined encoder/decoder of claim 2 further comprising:
 a pulse adder, having an output, a first input coupled to the frequency synthesizer and a second input coupled to the decoder means output, for increasing the frequency at said adder output in response to said detect signal at said second input.

4. An improved combined encoder/decoder circuit, operable in an encoder mode to provide tone output signals of a pre-determined frequency and a decoder mode to provide a detect signal in response to a signal applied to the input having a predetermined tone frequency, comprising:
 (a) a frequency generating means having an output and a control input for generating a signal of pre-determined frequency at the output in response to a signal applied to the control input;
 (b) decoder means, having a first and second input and an output, for producing a detect signal at the output in response to receipt of signals of the pre-determined tone frequency at said first input;
 (c) control means having an output coupled to the decoder means second input and a control input terminal, and having another input coupled to the output of the frequency generating means for reducing the response of the decoder means to the pre-determined tone frequency in response to said detect signal applied to the control input terminal.

5. The improved combined encoder/decoder of claim 4, wherein the decoder means generates said detect signal at said output in response to reaching a pre-determined threshold condition after detecting said signal of predetermined tone frequency control means.

6. The improved combined encoder/decoder of claim 4 or claim 5, wherein the decoder means is pre-settable to have at least two different frequency response bandwidths.

7. The improved combined encoder/decoder of claim 4, wherein the frequency generating means further comprises a phase locked loop frequency synthesizer.

* * * * *